June 16, 1964
C. DE BUIGNE
3,137,389
EXTRUSION CLADDING PRESS AND METHOD
Filed Dec. 29, 1958
4 Sheets-Sheet 2
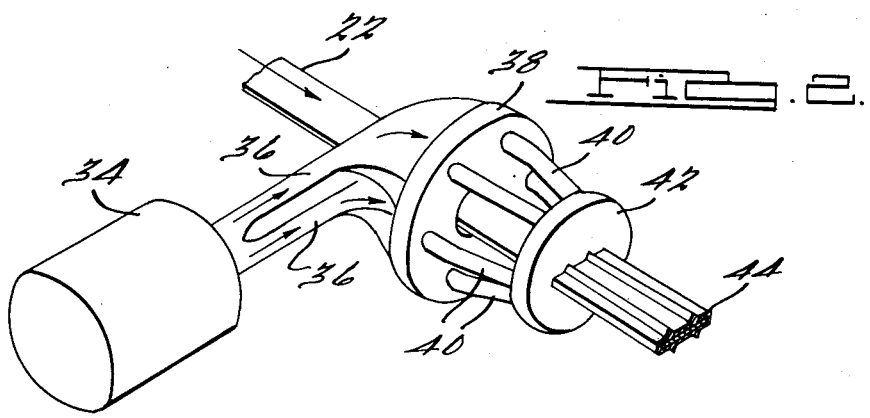
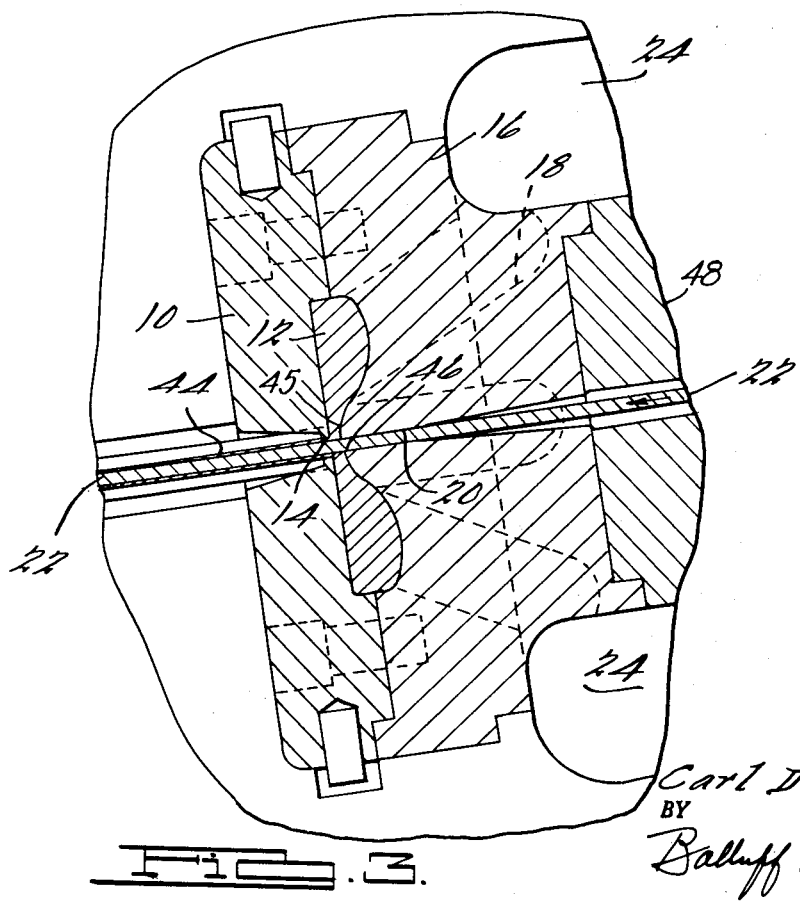
INVENTOR.
Carl De Buigne
BY
Balluff and McKinley
ATTORNEYS.

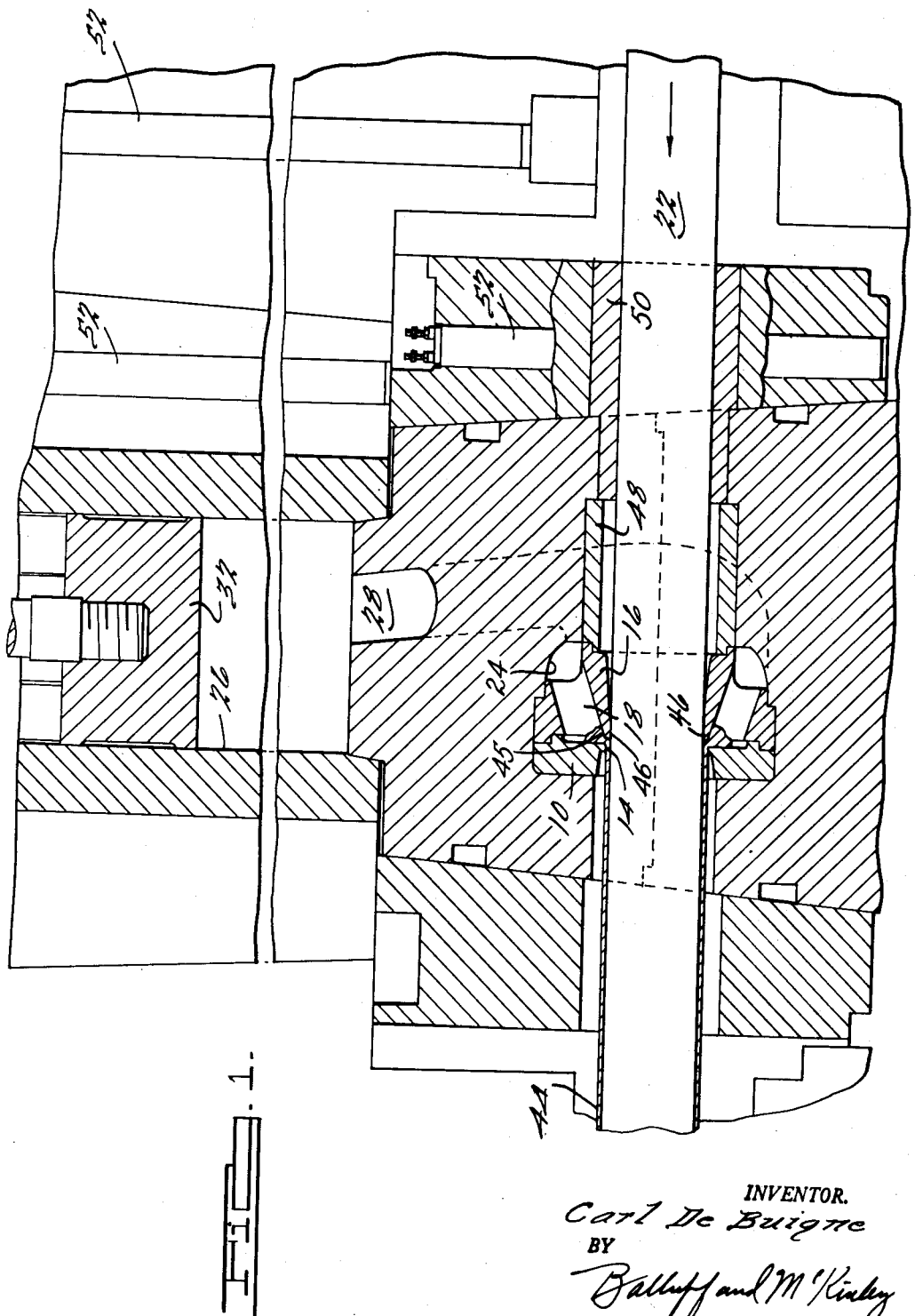

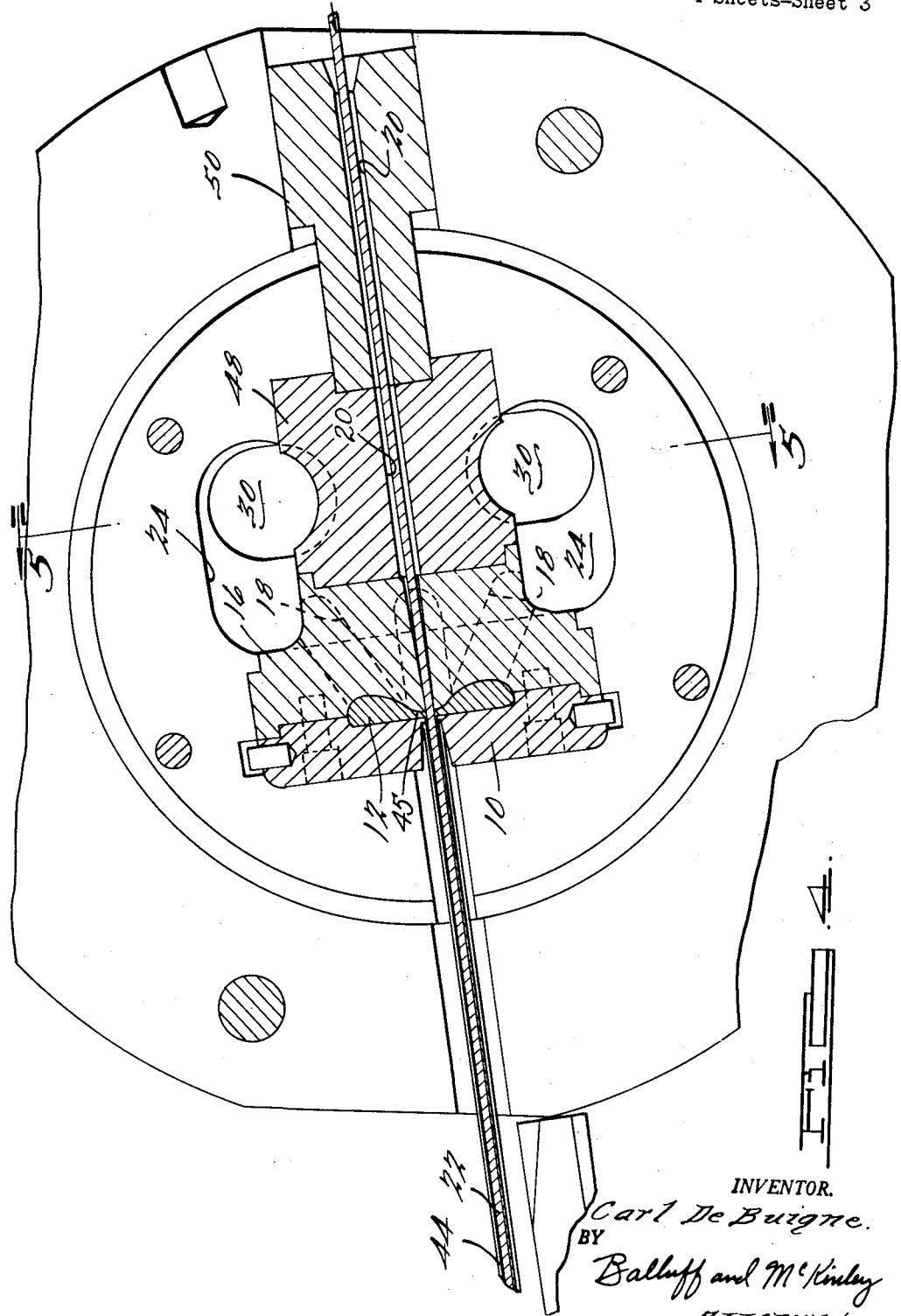

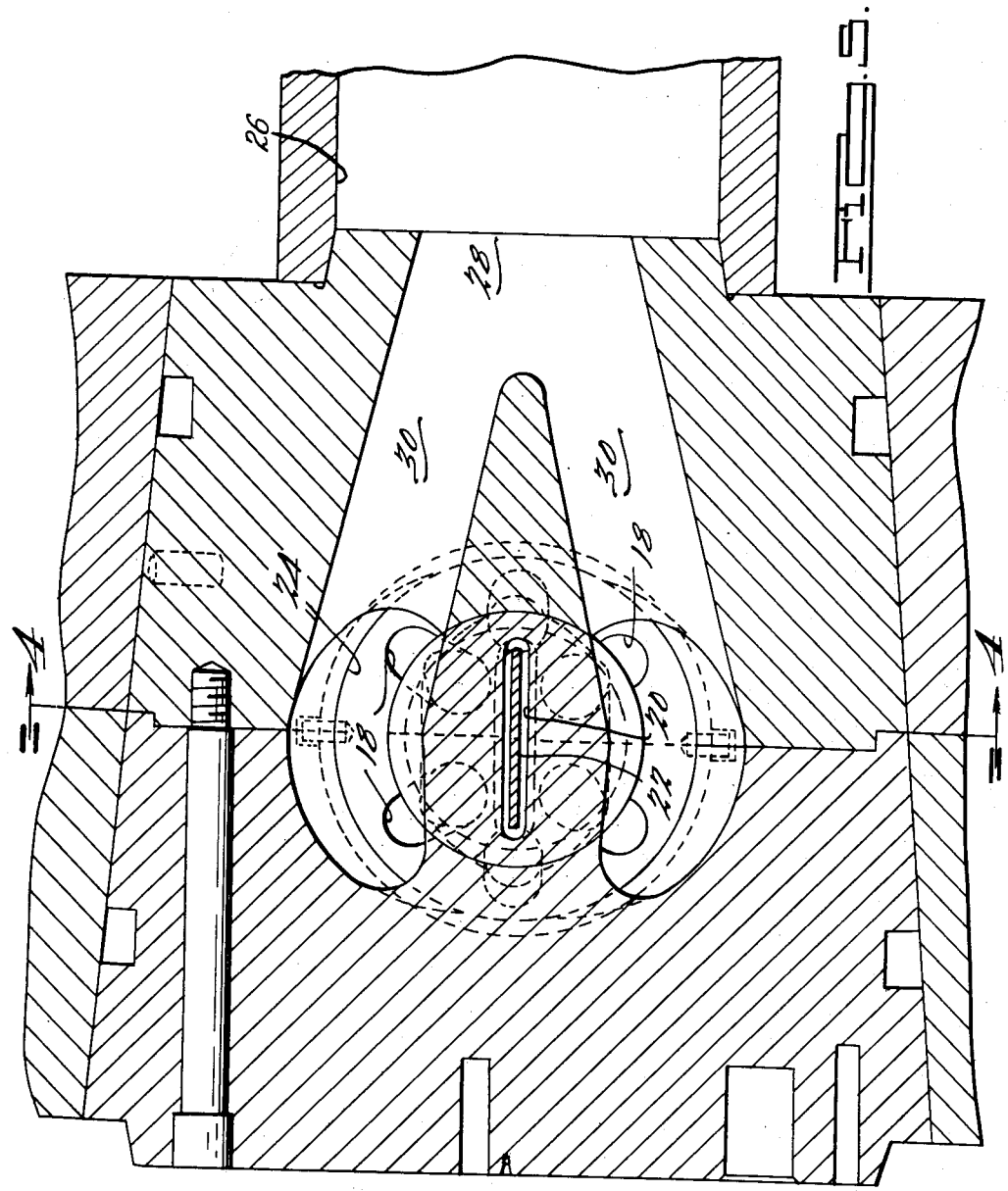

United States Patent Office 3,137,389
Patented June 16, 1964

3,137,389
EXTRUSION CLADDING PRESS AND METHOD
Carl De Buigne, Grosse Pointe Shores, Mich., assignor to the United States of America as represented by the United States Atomic Energy Commission
Filed Dec. 29, 1958, Ser. No. 783,271
2 Claims. (Cl. 207—4)

This invention relates to a method of cladding metal and apparatus therefor.

A principal object of the invention is to provide a method of and means for bonding metal, such as aluminum, to an underbody, such as a ferrous metal.

Other and further objects of the invention will be apparent from the following description and claims and may be understood by reference to the accompanying drawings, of which there are four sheets, which by way of illustration show a preferred embodiment of the invention and what I now consider to be the best mode of applying the principles thereof. Other embodiments of the invention may be used without departing from the scope of the present invention as set forth in the appended claims.

In the drawings:

FIGURE 1 is a fragmentary view, partly in section, of an extrusion cladding press embodying my invention;

FIGURE 2 is a diagram of the cladding metal as it flows through the press, with all of the die structure eliminated;

FIGURE 3 is an enlarged fragmentary sectional view through the welding chamber of the cladding press;

FIGURE 4 is a sectional view similar to FIGURE 3 but on a reduced scale, and taken generally along the line 4—4 of FIGURE 5; and FIGURE 5 is a sectional view taken generally along the line 5—5 of FIGURE 4.

An extrusion cladding press embodying my invention comprises a porthole extrusion die 10 forming a wall of an annular welding chamber 12 with an extrusion aperture 14 which defines the exterior of the extrusion issuing from the chamber 12, a mandrel 16 forming an opposite wall of the chamber 12 and having a series of metal supply passages 18 symmetrically disposed with respect to the axis of the chamber 12, each of said passages 18 terminating at one end in an opening in the welding chamber. The mandrel 16 has an axially disposed core passage 20 terminating in an opening or mouth 46 in the welding chamber in line with and opposite the extrusion aperture 14 so as to permit axial movement of a metal core 22 of axially uniform cross section through the welding chamber 12 and extrusion aperture 14. An annular vestibule 24 is disposed about the axis of chamber 12 and axially spaced from the welding chamber 12 and directly communicates with the other ends of the metal supply passages 18. A billet cylinder 26 adapted to hold a solid billet of cladding metal is disposed with its axis transverse to the die axis. Passage means 28 communicating with the discharge end of the billet cylinder 26 and including bifurcated portions 30 communicate with the vestibule 24. A ram 32 is operatively arranged to react on the billet in the cylinder 26 for causing the metal thereof to flow through the passages 28 and 30 into the vestibule 24, the bifurcated passages 30 straddling the axial core passage 20 and opening into the vestibule in the wall thereof opposite said metal supply passages 18 for feeding metal in twin streams parallel to the die axis into the vestibule 24. The core passage opening 46 in the welding chamber 12 is smaller in size than the extrusion aperture 14.

The welding chamber wall formed by the mandrel 16 around the core passage opening 46 is spaced from the welding chamber wall around the extrusion aperture 14 so as to expose the core 22 as it moves from the core passage through the welding chamber 12 to the extrusion aperture 14 so that metal in the welding chamber 12 in response to the pressure applied by the ram 32 to the billet in the cylinder 26, is forced into intimate contact with all of the surfaces of the core 22 and metallurgically bonded or welded thereto as the core moves from the core passage into and through the welding chamber 12, said core defining the interior of the extrusion issuing from the welding chamber through the aperture 14.

The bifurcated passage portions 30 are curved so as to efficiently turn the twin streams of flowing metal from the billet through a right angle and feed such metal into the vestibule where it coalesces to form a homogeneous mass. The vestibule 24 functions to uniformly distribute the flowing metal to the multiplicity of passages 18 clustered about the axis for effective delivery to the welding chamber 12.

The billet of aluminum in the cylinder 26 is heated to a suitable extruding temperature, for example, about 1000° to 1100° F., and a suitable pressure, say from 40,000 pounds per square inch to 100,000 pounds per square inch or more, is applied by the ram 32 to the heated billet of aluminum so as to cause the same to flow through the passages 28 and 30, the vestibule 24, the passages 18, the welding chamber 12, and through the extrusion aperture 14. The temperature to which the billet is heated and the pressures employed to effect the extrusion thereof may vary within wide limits, as is well understood in the art of extrusion of metals.

In the welding chamber 12 the streams of metal supplied through the passages 18 will coalesce to form a homogeneous mass of flowing metal. FIGURE 2 illustrates the flow of the metal from a billet 34 in twin streams 36 into the vestibule where it forms an annular mass 38. The metal flowing through the passages 18 is designated at 40, while the metal in the chamber 12 is indicated at 42. In the welding chamber 12 the metal is bonded to the core 22 which issues from the extrusion aperture 14 with a layer 44 of cladding metal bonded thereto. The thickness of the layer 44 of cladding metal will depend upon the clearance between the core 22 and the extrusion aperture 14. This layer may be as thin as about .010 inch, and may be as thick as .020 inch or more. The core may be of ferrous or a non-ferrous metal.

Prior to entering the press, the core preferably is preheated to a suitable temperature, say 600° to 900° F. in the case of mild rolled steel, in an inert atmosphere, such as argon or helium, so as to prevent oxidation of the core. The core may be plated with a nickel or tin flash of the order of .0005 inch, and the surface of the core must be clean, i.e. free of oxides and other impurities, so as not to impair the formation of a metallurgical bond in the welding chamber 12 between the cladding metal and the core metal.

The wall of the mandrel 16 around the core passage opening 46 is axially spaced from the opposite chamber wall in which the extrusion aperture 14 is formed so that the cladding metal in contact with the core 22 will be subject to sufficient pressure so as to weld the cladding metal to the core metal prior to extrusion of the cladding metal and without deforming the core. Such axial spacing is substantially greater than the clearances between the core 22 and the land which forms the extrusion aperture 14. I have found a ratio of 2½ to 1 to give excellent results. Such chamber walls are so formed that the core 22 is propelled outwardly through the extrusion aperture 14 with the cladding metal. However, I have found that it is possible, by applying a pulling force to the extruded bimetal after it has chilled, to pull the clad metal from the press at a rate substantially in excess of the rate at which the core would be self propelled. In practice I have achieved extrusion speeds of 4 to 5 feet per minute where the core is propelled by the extrusion, and extrusion speeds of 10 to 40 feet per minute where additional force is applied to the core for moving the same through the press. In lieu of pulling the bimetal, the trailing end of the core may be pushed so as to accelerate the travel of the same through the press. The core passage 20 adjacent the mouth 46 thereof should closely fit the core 22 so as to prevent the cladding metal in the welding chamber from entering such passage and setting up resistance in the passage to the axial movement of the core 22.

Rearwardly of the mandrel 16 the core passage 20 is formed by a core 48 which defines in part the vestibule 24, and ahead of the core 48 a member 50 forms a portion of the core passage 20. The core 22 may be round or any other desired shape, and the passage 20 is shaped to fit the core.

Because of the tremendous pressures involved, it will be understood that the parts of the press are made rugged so as to resist distortion at the pressure and temperature at which the press is operated. Heating means such as electric resistance heaters 52 may be employed to heat the press, the cladding metal, and the core 22 as well understood in the extrusion art.

The extrusion aperture 14 is larger in cross section than the core 22 and of a cross sectional shape so as to cooperate with the core in defining the thickness and form of the extruded cladding 44 bonded to the core 22. The tip 45 of the mandrel around mouth 46 and the die defining the extrusion aperture 14 are designed and spaced so that the extruding metals scours the surface of the core 22 to promote bonding and exerts sufficient pressure between the cladding metal and the core 22 to achieve the intimate contact required for a metallurgical bond. Thus the tip 45 and the die 10 around the aperture 14 are designed so that the extruded metal exerts a large component of force perpendicular to the surface of the core 22. This component tends to scour the core surface and thus break up any surface films, such as oxides, which might inhibit bonding. The distance between the tip 45 and the die surface defining the aperture 14 is fixed and this distance controls the area of the core 22 over which the scouring action occurs.

The core 22 acts as a moving mandrel, and a tube of the cladding metal is formed in the annulus between the core and the land defining the extrusion aperture, and the thickness of the extrusion is governed by this annulus. In fact, the formation of the extruded tube is dependent upon the presence and dimensions of the core to be clad. As previously noted, this clearance should be less than the projected distance from the tip 45 to the surface defining the extrusion aperture 14 so as to insure adequate pressure against the core 22. The length of the land defining the extrusion aperture 14 also contributes to the bonding pressure and the time of applied pressure. The distance between the tip 45 and the die defining the aperture 14 is also designed, as previously noted, so that there is a tangential component of force propelling the core, but this component is relatively small.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. An extrusion cladding press for bonding metal such as aluminum to a core of axially uniform cross section, comprising a porthole extrusion die having an annular welding chamber with an axial extrusion aperture in a wall of said chamber disposed normal to the axis thereof, a series of metal supply passages symmetrically disposed about said axis, each of which passages terminates in an opening in said welding chamber in a wall opposite said extrusion aperture, an annular vestibule disposed about said axis and axially spaced from said welding chamber and directly communicating with the other ends of said metal supply passages, an axially disposed core passage terminating in an opening in said welding chamber in said wall opposite said extrusion aperture, a billet cylinder adapted to hold a solid billet of cladding metal and disposed with its axis transverse to said die axis, passage means communicating at one end with said billet cylinder and including bifurcated portions communicating with said vestibule, a ram arranged to react on said billet for causing the same to flow through said passage means, said bifurcated portions straddling said axial passage and being curved and opening into said vestibule in the wall thereof opposite said metal supply passages for feeding metal in twin streams parallel to said axis into said vestibule, said core passage opening into said welding chamber being in line with and smaller in size than said extrusion aperture, said welding chamber wall around said core passage opening being axially spaced from said welding chamber wall around said extrusion aperture so as to expose the core to the cladding metal in said welding chamber and to permit flow of metal from said welding chamber through said extrusion aperture in response to the pressure applied by said ram to the billet in said cylinder whereby cladding metal in said welding chamber is forced in a direction perpendicular to and into intimate contact with said core and welded thereto prior to its extrusion from the welding chamber, those portions of said welding chamber walls surrounding said core passage opening and said extrusion aperture being shaped so that the metal between said core and said extrusion aperture propels the same through said extrusion aperture, said core cooperating with said extrusion aperture to define the thickness and form of the extruded cladding bonded to said core.

2. That method of continuous welding cladding metal such as aluminum to a metal core which comprises axially moving such core, the surface of which is clean and free of oxides, along a predetermined path through a core opening of a mandrel in a welding chamber, across said welding chamber and through the extrusion aperture thereof and wherein said mandrel is arranged in close coupled relation to said extrusion aperture, applying pressure to a heated billet of cladding metal, in a solid state, disposed externally of said welding chamber, so as to cause the metal of said billet to flow, directing the flow of said cladding metal into said welding chamber so as to coalesce said cladding metal therein under such pressure in contact with said moving core and so as to extrude cladding metal from said welding chamber through said extrusion aperture, directing cladding metal in the welding chamber under such pressure in an annular zone of fixed length immediately adjacent said core to flow perpendicularly to the core into intimate contact therewith for welding cladding metal prior to its extrusion from the welding chamber to the surface of the core as the core moves through the welding chamber while maintaining a uniform length of said core exposed to the cladding metal in the welding chamber, directing the flow of cladding metal in the welding chamber under such pressure so as to propel said core with the cladding metal welded thereto through said extrusion aperture, and controlling the thickness of the extruded cladding metal welded to the core by the clearance between said moving core and the surface defining the extrusion aperture.

(References on following page)

References Cited in the file of this patent

UNITED STATES PATENTS

| | | |
|---|---|---|
| 345,956 | Eaton | July 20, 1886 |
| 410,410 | Goodwin | Sept. 3, 1889 |
| 867,658 | Hoopes et al. | Oct. 8, 1907 |
| 1,167,626 | Claremont et al. | Jan. 11, 1916 |
| 1,877,880 | Jacobson et al. | Sept. 20, 1932 |
| 2,320,801 | Simons | June 1, 1943 |
| 2,720,310 | Yack et al. | Oct. 11, 1955 |
| 2,741,363 | Billen et al. | Apr. 10, 1956 |
| 2,841,546 | Robinson | July 1, 1958 |

FOREIGN PATENTS

| | | |
|---|---|---|
| 909,334 | Germany | Apr. 15, 1954 |
| 5,926 | Great Britain | 1890 |
| 755,686 | Great Britain | Aug. 22, 1956 |
| 800,470 | Great Britain | Aug. 27, 1958 |
| 121,182 | Sweden | Mar. 16, 1948 |